United States Patent
Okamoto et al.

(10) Patent No.: US 7,810,408 B2
(45) Date of Patent: Oct. 12, 2010

(54) ENERGY ABSORBING MECHANISM OF STEERING COLUMN SUPPORTING APPARATUS

(75) Inventors: Hideaki Okamoto, Aichi (JP); Toshifumi Ooeda, Aichi (JP); Seiji Tanaka, Aichi (JP)

(73) Assignee: Mitsubishi Jidosha Kogyo K.K., Tokyo (JP)

( * ) Notice: Subject to any disclaimer, the term of this patent is extended or adjusted under 35 U.S.C. 154(b) by 1086 days.

(21) Appl. No.: 10/843,438

(22) Filed: May 12, 2004

(65) Prior Publication Data

US 2005/0006891 A1    Jan. 13, 2005

(30) Foreign Application Priority Data

May 15, 2003    (JP)    ............................ P2003-137616

(51) Int. Cl.
    *B62D 1/18*    (2006.01)
(52) U.S. Cl. ..................... 74/493; 280/775; 280/777
(58) Field of Classification Search .................. 280/775, 280/777; 74/492, 493
    See application file for complete search history.

(56) References Cited

U.S. PATENT DOCUMENTS

| | | | |
|---|---|---|---|
| 5,425,553 A * | 6/1995 | Yazane et al. ................ 280/777 |
| 5,470,107 A * | 11/1995 | Muntener et al. ........... 280/777 |
| 5,605,352 A * | 2/1997 | Riefe et al. .................. 280/777 |
| 5,788,278 A * | 8/1998 | Thomas et al. ............... 280/777 |
| 6,216,552 B1 * | 4/2001 | Friedewald et al. ........... 74/493 |
| 6,378,903 B1 * | 4/2002 | Yabutsuka et al. ........... 280/777 |
| 6,523,432 B1 * | 2/2003 | Yamamoto et al. ............ 74/492 |
| 2001/0011486 A1 * | 8/2001 | Glinowiecki et al. .......... 74/492 |

FOREIGN PATENT DOCUMENTS

| | | | |
|---|---|---|---|
| DE | 4404375 A1 * | 9/1994 |
| JP | 62-23771 U | 2/1987 |
| JP | 11-115770 A | 4/1999 |

* cited by examiner

*Primary Examiner*—Richard W Ridley
*Assistant Examiner*—Alan B Waits
(74) *Attorney, Agent, or Firm*—Birch, Stewart, Kolasch and Birch, LLP

(57) ABSTRACT

There is provided a steering column supporting apparatus in which tilt pins are locked on a tilt bracket fixed to a vehicle body and engaged with tilt plates welded to respective both sides of a steering column, and slotted holes extended in the axial direction of the steering column are formed in the tilt plates. A bulging part is formed on a lower surface of the steering column, and is designed to be larger in size than a gap between the lower surface of the steering column and the tilt bracket and increased in height as it goes rearward in the direction of the length of a vehicle. Therefore, it is possible to effectively reduce impact load applied to the steering column in the event of head-on vehicle crash.

15 Claims, 4 Drawing Sheets

ENERGY ABSORBING MECHANISM OF STEERING COLUMN SUPPORTING APPARATUS

CROSS-REFERENCE TO RELATED APPLICATION

The application incorporates by references the subject matter of Application No. 2003-137616 filed in Japan on May 15, 2003, on which a priority claim is based on 35 U.S.C. §119(a).

BACKGROUND OF THE INVENTION (1) Field of the Invention

The present invention relates to a steering column with a vehicle steering shaft disposed therein, and more particularly to a supporting apparatus for a tilt type steering column which is capable of absorbing impact applied in the event of head-on vehicle crash.

(2) Description of the Related Art

Conventionally, as a supporting structure for a tilt type steering column of a vehicle, supporting structures disclosed in Japanese Laid-Open Patent Publication No. 11-115770 and Japanese Utility Model Publication No. 62-23771 have been known.

The supporting structure disclosed in Japanese Laid-Open Patent Publication No. 11-115770 has the problem that once a steering column has been released from a vehicle body forward in the direction of the length of a vehicle, energy cannot be absorbed by the steering column.

Also, the supporting structure disclosed in Japanese Utility Model Publication No. 62-23771 has the problem that the position of a steering column held by support pins for tilting the steering column, i.e. the position of a steering wheel at the rear end of the steering column is unstable because the support pins shift while crushing edges of slotted holes and hence relatively small impact energy can be only absorbed. Therefore, for example, in the case where an air bag is mounted on the steering wheel, there is a possibility that the form of the airbag being inflated toward the driver is unstable.

SUMMARY OF THE INVENTION

The present invention provides a steering column supporting apparatus which includes a tilt bracket located fixed to a vehicle body; a support pin locked on one of the tilt bracket and the steering column, and passed through a hole formed in the other one of the tilt bracket and the steering column, such that the steering column tilts about the support pin; a slotted hole formed integrally with the other one of the tilt bracket and the steering column, and extended continuously from the hole toward a steering wheel in a direction substantially identical with an axial direction of the steering column; and a bulging part formed integrally with the steering column at a location closer to the steering wheel than the tilt bracket, and designed to be larger than a gap between the steering column and the tilt bracket.

BRIEF DESCRIPTION OF THE DRAWINGS

The nature of this invention, as well as other objects and advantages thereof, will be explained in the following with reference to the accompanying drawings, in which like reference character designate the same or similar parts throughout figure and wherein.

DETAILED DESCRIPTION OF THE INVENTION

The present invention will now be described in detail with reference to the accompanying drawings showing an embodiment thereof.

Figure 1A:
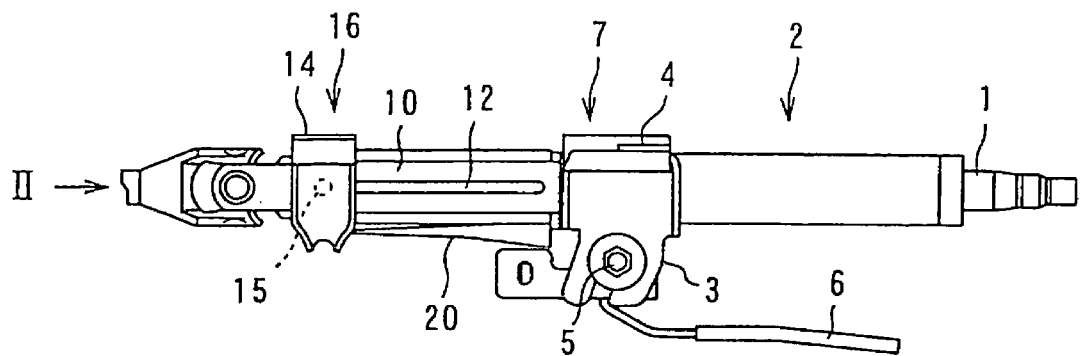
FIG. 1A is a side view showing a steering column supporting apparatus according to an embodiment of the present invention.

As shown in FIG. 1A, substantially the center of a steering column 2 with a steering shaft 1 of a vehicle disposed therein is held on a vehicle body via a tilt rear mechanism 7. The tilt rear mechanism 7, which is publicly known, is comprised of a column bracket 3 which is fixed to the steering column 2, a capsule 4 which is engaged with the column bracket 3 and fixed to the vehicle body, a tilt fixing shaft 5 which is engaged with the column bracket 3, a tilt lever 6, and so forth.

Further, as shown in FIGS. 1A and 2 to 4, tilt plates 10 are welded to the sides of the front end of the steering column 2, such that the tilt plates 10 oppose one another with the steering column 2 disposed between the tilt plates 10. Each of the tilt plates 10 is formed with a hole 11, and a slotted hole 12 which is continuously extended from the hole 11 toward a steering wheel located in the rear in the direction of the length of the vehicle (on the right side of FIG. 1) in a direction substantially identical with the axial direction of the steering column 2. On the other hand, tilt pins 15 are locked on a substantially U-shaped tilt bracket 14 which is fastened on the vehicle body by bolts 13. The tilt pins 15 are passed through the respective holes 11 of the tilt plates 10 so that the steering column 2 can tilt about the tilt pins 15. A tilt front mechanism 16 which holds the front end of the steering column 2 on the vehicle body is comprised of the above-mentioned component parts. Therefore, if there is no boundary 17 between the holes 11 and the slotted holes 12, the tilt pins 15 are relatively guided toward the steering wheel along the slotted holes 12.

Further, a bulging part 20 formed of a relatively thick steel plate is welded to a lower surface of the steering column 2 in the tilt rear mechanism 16 and at a location closer to the steering wheel located in the rear in the direction of the length of the vehicle than the tilt bracket 14. The bulging part 20 is substantially V-shaped in longitudinal cross-section as indicated by a dashed line in FIG. 2, and is formed to be gradually increased in height toward the tilt bracket 14 as it becomes closer to the steering wheel (i.e. rearward in the direction of the length of the vehicle). The bulging part 20 is formed to be larger in size than a gap between the lower surface of the steering column 2 and the tilt bracket 14.

Therefore, in the event of head-on vehicle crash, the column bracket 3 is released forward in the direction of the length of the vehicle (leftward as viewed in FIG. 1A) from the capsule 4 in the tilt rear mechanism 7 due to great impact load which is applied from the steering wheel side in the axial direction of the steering column 2 by inflating reactive force of an air bag mounted on the steering wheel. Then, the boundaries 17 of the tilt plates 10 in the tilt front mechanism 16 are easily crushed by the tilt pins 15, and the tilt pins 15 are relatively guided along the slotted holes 12 of the tilt plates 10 and rearward in the direction of the length of the vehicle. As a result, the steering column 2 is displaced forward in the direction of the length of the vehicle.

On this occasion, the tilt pins 15 are relatively guided along the slotted holes 12 of the tilt plates 10 and rearward in the direction of the length of the vehicle, so that the steering column 2 is supported without being displaced. Therefore, the position of the steering wheel at the rear end of the steering column can be stable, and the inflation form of the airbag mounted on the steering wheel can be substantially constant, so that the air bag can absorb impact in a satisfactory manner.

Figure 1B:
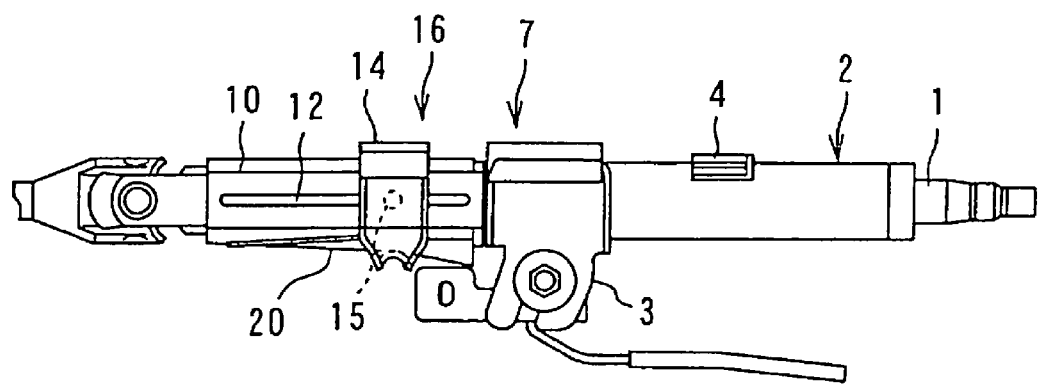
FIG. 1B is a side view showing a steering column 2 which has been displaced forward in the direction of the length of a vehicle.
Figure 2:
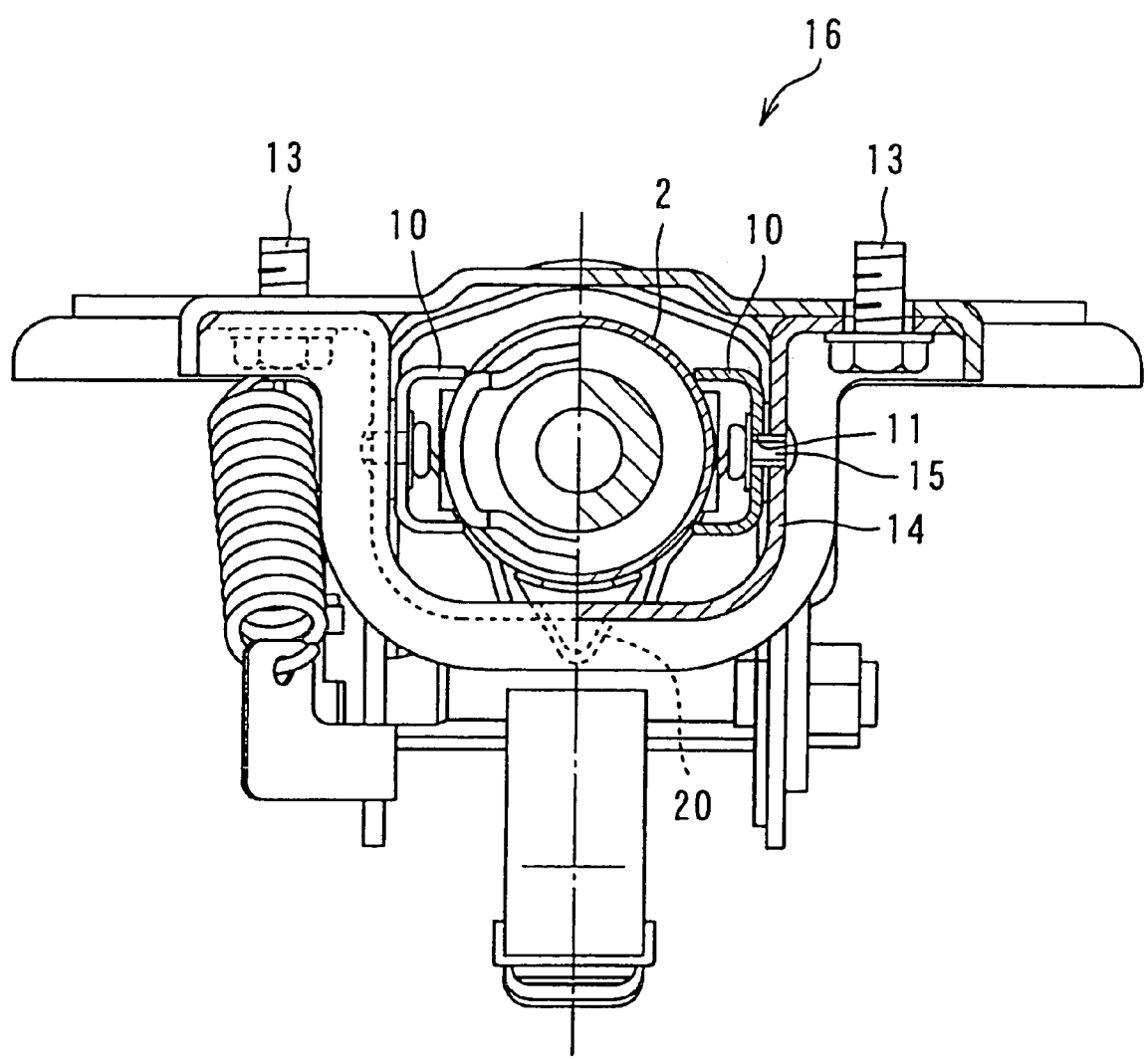
FIG. 2 is an enlarged view taken along an arrow 11 of FIG. 1.
Figure 3:
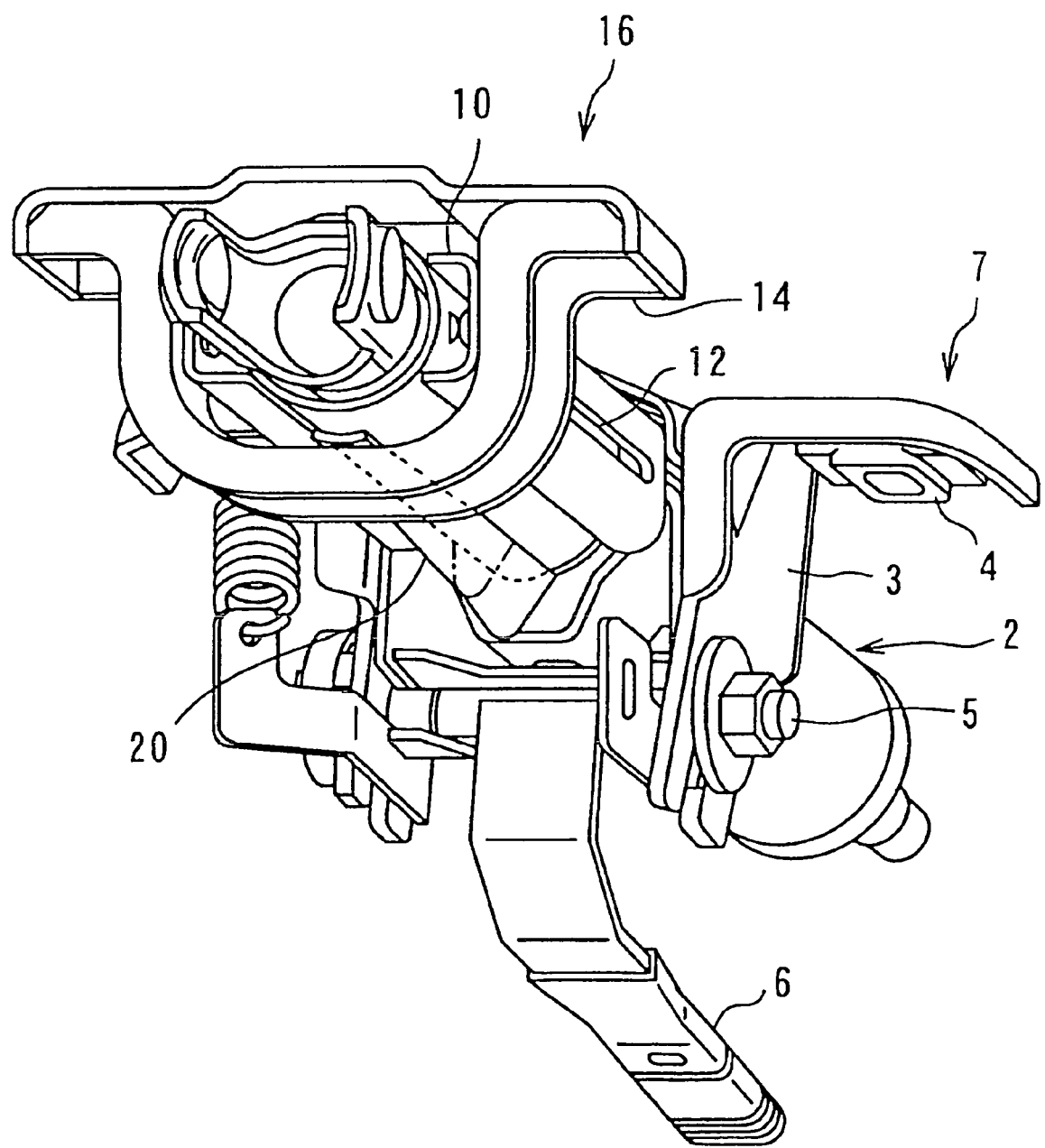
FIG. 3 is a perspective view showing the steering column supporting apparatus according to the embodiment.
Figure 4:
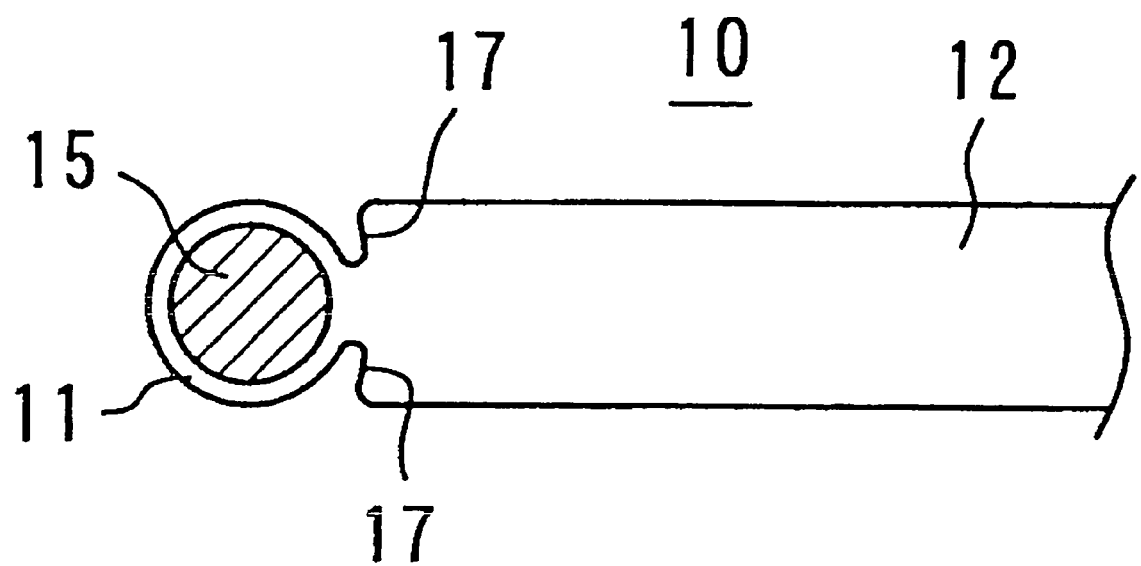
FIG. 4 is a view useful in explaining a part of the steering column supporting apparatus according to the embodiment.

Further, when the steering column 2 is displaced forward in the direction of the length of the vehicle, the tilt bracket 14 and the bulging part 20 of the steering column 2 come to abutment with each other. Since the tilt bracket 14 usually has a high stiffness, the bracket 14 continuously crushes the bulging part 20 from front to back in the length of the direction of the vehicle as shown in FIG. 1B as the steering column 2 is displaced forward in the direction of the length of the vehicle as above. This absorbs energy of the impact load applied to the steering column 2. Further, due to the engagement between the slotted holes 12 of the tilt plates 10 and the tilt pins 15, the position of the steering column 2 can be kept substantially constant, and the distance between the tilt bracket 14 and the bulging part 20 can also be kept constant. Therefore, the amount of crush of the tilt bracket 14 by the tilt bracket 14 is substantially constant relative to the forward displacement of the steering column 2 in the direction of the length of the vehicle, so that the amount of energy absorbed by crushing of the bulging part can be easily adjusted. As a result, the steering column 2 can further effectively protect the driver from impact in cooperation with the air bag and others.

It is to be understood that the present invention is not limited to the above described embodiment. For example, the same effects can be obtained as in the above described embodiment even if the holes 11 and the tilt pins 15 are provided in the tilt bracket 14 and the steering column 2, respectively, contrary to the above described embodiment.

The invention claimed is:

1. A steering column supporting apparatus, comprising:
    a steering column provided with a steering shaft attached to a steering wheel;
    a tilt bracket located outside said steering column and fixed to a vehicle body, the tilt bracket having a U-shaped part opposing a lower face and side faces of the steering column;
    a column bracket provided between the steering wheel and the tilt bracket and fixing the steering column to the vehicle body;
    a bulging part provided on the lower face of said steering column and at a location between said column bracket and said tilt bracket; and
    a support pin provided on one of said tilt bracket and said steering column, and passed through a hole formed in the other one of said tilt bracket and said steering column, thereby defining a center of a tilting action of the steering column relative to the U-shaped part of the tilt bracket,
    wherein a slotted hole is formed in the other one of said tilt bracket and said steering column, and extended continuously from the hole in a direction identical with an axial direction of said steering column;
    wherein a boundary is formed between the hole and said slotted hole;
    wherein a gap is formed between the bulging part and the tilt bracket to allow the steering column to tilt about the support pin under a condition that the support pin is held within the hole;
    wherein the boundary is crushed by the support pin according to an initial impact of a vehicle collision;
    wherein the support pin is allowed to displace along the slotted hole during the vehicle collision after the boundary is crushed;
    wherein said tilt bracket comes in contact with said bulging part when said support pin is displaced along said slotted hole; and
    wherein a thickness of the bulging part increases as the bulging part extends rearward in the direction of the length of the vehicle, so that a part of said bulging part is crushed by the U-shaped part of said tilt bracket during the vehicle collision.

2. A steering column supporting apparatus according to claim 1, wherein said support pin is locked on said tilt bracket, and passed through the hole formed in said steering column.

3. A steering column supporting apparatus according to claim 2, wherein
    a plurality of boundaries are formed between the hole and said slotted hole, and are crushed by said support pin before said support pin is displaced along said slotted hole.

4. A steering column supporting apparatus according to claim 3, wherein the boundaries includes two opposing boundaries that extend from opposing sides of the slotted hole.

5. A steering column supporting apparatus according to claim 2, further comprising:
    tilt plates provided on both sides of said steering column, such that the steering column is sandwiched between the tilt plates, and extended between said steering column and said tilt bracket, and the hole and said slotted hole are formed in said tilt plates.

6. A steering column supporting apparatus according to claim 1, wherein the boundary defines at least a portion of the hole.

7. A steering column supporting apparatus according to claim 1, wherein said bulging part is provided along an axis of said steering column, and a thickness of the bulging part increases as the bulging part extends rearward in the direction of the length of the vehicle.

8. A steering column supporting apparatus according to claim 7, wherein said bulging part is V-shaped in longitudinal cross-section.

9. A steering column supporting apparatus, comprising:
    a steering column provided with a steering shaft attached to a steering wheel;
    a tilt bracket located outside said steering column and fixed to a vehicle body, the tilt bracket having a U-shaped part opposing a lower face and side faces of the steering column;
    a column bracket provided between the steering wheel and the tilt bracket and fixing the steering column to the vehicle body;
    a support pin provided on one of said tilt bracket and said steering column, and passed through a hole formed in the other one of said tilt bracket and said steering column, thereby defining a center of a tilting action of the steering column relative to the U-shaped part of the tilt bracket;
    a first device provided in the other one of said tilt bracket and said steering column, said first device being extended continuously from the hole in a direction identical with an axial direction of said steering column;
a second device provided on the lower face of the steering column and at a location between said column bracket and said tilt bracket; and
a boundary formed between the hole and said first device,
wherein a gap is formed between the second device and the tilt bracket to allow the steering column to tilt about the support pin under a condition that the support pin is held within the hole;
wherein the boundary is crushed by the support pin according to an initial impact of a vehicle collision;
wherein the support pin is allowed to displace along the first device during the vehicle collision after the boundary is crushed, so that a moving direction of the steering column is restricted;
wherein said tilt bracket comes in contact with said second device when said support pin is displaced along the first device; and
wherein a thickness of the second device increases as the second device extends rearward in the direction of the length of the vehicle, so that a part of said second device is crushed by the U-shaped part of said tilt bracket to absorb energy generated during the vehicle collision.

10. A steering column supporting apparatus according to claim 9, wherein said first device comprises a slotted hole extended from the hole in a direction identical with said axial direction of said steering column and rearward of said tilt bracket in the direction of the length of the vehicle.

11. A steering column supporting apparatus according to claim 9, wherein said second device comprises a bulging part crushed by said tilt bracket as said tilt bracket is displaced.

12. A steering column supporting apparatus according to claim 11, wherein the bulging part is provided on said steering column and at a location behind said tilt bracket in a direction of a length of a vehicle, and formed to be larger in size than a gap between said steering column and said tilt bracket.

13. A steering column supporting apparatus according to claim 9, wherein the boundary is formed between the hole and said slotted hole and defines a gap smaller than a height of the slotted hole, in a direction perpendicular to a longitudinal direction of the slotted hole, and crushed by said support pin before said support pin is displaced along said slotted hole.

14. A steering column supporting apparatus, comprising:
a steering column provided with a steering shaft attached to a steering wheel;
a tilt bracket located outside said steering column and fixed to a vehicle body, the tilt bracket having a U-shaped part opposing a lower face and side faces of the steering column;
a bulging part provided on the lower face of said steering column and at a location behind said tilt bracket in a direction of a length of said vehicle; and
a support pin provided on one of said tilt bracket and said steering column, and passed through a hole formed in the other one of said tilt bracket and said steering column, thereby defining a center of a tilting action of the steering column relative to the U-shaped part of the tilt bracket,
wherein a slotted hole is formed in the other one of said tilt bracket and said steering column, and extended continuously from the hole in a direction identical with an axial direction of said steering column;
wherein a boundary is formed between the hole and said slotted hole;
wherein a gap is formed between the bulging part and the tilt bracket to allow the steering column to tilt about the support pin under a condition that the support pin is held within the hole;
wherein the boundary is crushed by the support pin according to an initial impact of a vehicle collision;
wherein the support pin is allowed to displace along the slotted hole during a vehicle collision after the boundary is crushed;
wherein said tilt bracket comes in contact with said bulging part when said support pin is displaced along said slotted hole; and
wherein said bulging part extends along the axial direction of said steering column, and a thickness of the bulging part increases as the bulging part extends rearward in the direction of the length of the vehicle, so that a part of said second device is crushed by the U-shaped part of said tilt bracket to absorb energy generated during the vehicle collision.

15. A steering column supporting apparatus, comprising:
a steering column provided with a steering shaft attached to a steering wheel;
a tilt bracket located outside said steering column and fixed to a vehicle body, the tilt bracket having a U-shaped part opposing a lower face and side faces of the steering column;
a support pin provided on one of said tilt bracket and said steering column, and passed through a hole formed in the other one of said tilt bracket and said steering column, thereby defining a center of a tilting action of the steering column relative to the U-shaped part of the tilt bracket;
a first device provided in the other one of said tilt bracket and said steering column, said first device being extended continuously from the hole in a direction identical with an axial direction of said steering column;
a second device provided on the lower face of the steering column and at a location between said steering column and said tilt bracket; and
a boundary formed between the hole and said first device,
wherein a gap is formed between the second device and the tilt bracket to allow the steering column to tilt about the support pin under a condition that the support pin is held within the hole;
wherein the boundary is crushed by the support pin according to an initial impact of a vehicle collision;
wherein the support pin is allowed to displace along the first device during said vehicle collision after the boundary is crushed, so that a moving direction of the steering column is restricted;
wherein said tilt bracket comes in contact with said second device when said support pin is displaced along the first device;
and
wherein said second device extends along the axial direction of said steering column, and a thickness of the second device increases as the second device extends rearward in the direction of the length of the vehicle so that a part of said second device is crushed by the U-shaped part of said tilt bracket to absorb energy generated during the vehicle collision.

* * * * *